United States Patent
Kim et al.

(10) Patent No.: US 7,940,325 B2
(45) Date of Patent: May 10, 2011

(54) APPARATUS AND METHOD OF CAPTURING IMAGES HAVING OPTIMIZED QUALITY UNDER NIGHT SCENE CONDITIONS

(75) Inventors: Sung-su Kim, Yongin-si (KR); Dae-su Chung, Seoul (KR); Byoung-ho Kang, Yongin-si (KR); Seong-deok Lee, Suwon-si (KR)

(73) Assignees: Samsung Electronics Co., Ltd, Suwon-Si (KR); Samsung Electro-Mechanics Co., Ltd., Suwon (KR)

( * ) Notice: Subject to any disclaimer, the term of this patent is extended or adjusted under 35 U.S.C. 154(b) by 484 days.

(21) Appl. No.: 12/155,315

(22) Filed: Jun. 2, 2008

(65) Prior Publication Data
US 2009/0051783 A1 Feb. 26, 2009

(30) Foreign Application Priority Data
Aug. 23, 2007 (KR) .................. 10-2007-0084945

(51) Int. Cl.
*H04N 5/238* (2006.01)

(52) U.S. Cl. ......... 348/364; 348/241; 348/252; 382/199

(58) Field of Classification Search ............... 348/208.1, 348/208.12, 229.1, 241, 252, 354, 356, 362, 348/363, 364; 382/199
See application file for complete search history.

(56) References Cited

U.S. PATENT DOCUMENTS

| | | | | |
|---|---|---|---|---|
| 6,259,825 | B1 * | 7/2001 | Yamazaki | 382/276 |
| 6,301,440 | B1 * | 10/2001 | Bolle et al. | 396/128 |
| 7,430,369 | B2 * | 9/2008 | Fukui | 396/78 |
| 7,565,068 | B2 * | 7/2009 | Endo | 396/52 |
| 7,738,018 | B2 * | 6/2010 | Hsieh et al. | 348/294 |
| 7,826,660 | B2 * | 11/2010 | Saquib et al. | 382/167 |
| 2004/0239771 | A1 * | 12/2004 | Habe | 348/208.12 |
| 2005/0099515 | A1 * | 5/2005 | Tsuruoka | 348/241 |

FOREIGN PATENT DOCUMENTS

| | | |
|---|---|---|
| JP | 2004-088149 | 3/2004 |
| JP | 2004-194106 | 7/2004 |
| JP | 2005-184246 | 7/2005 |
| JP | 2006-195037 | 7/2006 |

* cited by examiner

*Primary Examiner* — Lin Ye
*Assistant Examiner* — Chriss S Yoder, III
(74) *Attorney, Agent, or Firm* — Staas & Halsey LLP

(57) ABSTRACT

An apparatus and method of capturing images having an optimized quality during night time conditions is provided. The apparatus for capturing images includes an image-capturing unit that captures an light from an object and generates a first digital image, a night-scene-sensing unit sensing whether the first digital image is a night-scene image, an exposure-adjustment unit adjusting an optimized exposure time by comparing an edge level of the night-scene image with that of a pre-generated reference image if it is sensed that the input image is the night-scene image, and a controller controlling the image-capturing unit to generate a second digital image based on the adjusted exposure time.

20 Claims, 6 Drawing Sheets
(1 of 6 Drawing Sheet(s) Filed in Color)

FIG. 4 k BLUR LEVELS

Low          DEGREE OF BLUR          High

FIG. 5

5 BLUR LEVELS

JUDGED AS PERMISSIBLE

APPARATUS AND METHOD OF CAPTURING IMAGES HAVING OPTIMIZED QUALITY UNDER NIGHT SCENE CONDITIONS

CROSS-REFERENCE TO RELATED APPLICATION

This application is based on and claims priority from Korean Patent Application No. 10-2007-0084945, filed on Aug. 23, 2007 in the Korean Intellectual Property Office, the disclosure of which is incorporated herein in its entirety by reference.

BACKGROUND OF THE INVENTION

1. Field of the Invention

The present invention relates to an image-capturing technology, and more particularly to an apparatus and method of capturing images having an optimized quality under night scene conditions.

2. Description of the Prior Art

With the increasing use of diverse image devices such as a digital still cameras, phone cameras, digital single-lens reflex (DSLR) cameras, and so forth, ordinary users are increasingly demanding high quality images like those used by professionals.

In the case of capturing an image of an object using such an imaging device, however, image regions, which cannot be covered through automatic exposure control (AE), may be produced in special environments such as environments having back-lighting, low illumination, high contrast, and so forth.

In order to solve this problem, a method using an HDR (High Dynamic Range) sensor, and a method of capturing and synthesizing a plurality of images have been proposed. However, these methods have other problems such as design difficulty, increased manufacturing costs, and others.

Particularly, although there is a high demand for capturing high-quality images in low-illumination environments such as night scenes, most camera users have difficulty capturing high-quality images. In low-illumination environments, professional photographers use a method of securing a sufficient quantity of light by fixing a camera using a tripod and using a long exposure.

However, since general camera users usually do not use tripods, the long exposure for securing the quantity of light heightens the blur level of the image, which decreases the quality of the image. By contrast, the professional photographers learn by experience the exposure time suitable for inferior environments by properly considering the environment surrounding the object and the amount of camera shake that occurs without a tripod.

Generally, according to custom of camera manufacturers, the shutter speed is set to about ⅛ second in the case where shake compensation is performed using an optical image stabilizer (OIS), while in the case where no OIS is provided, the shutter speed is set to about 1/30 second.

However, such a uniform setting of the exposure time may make it impossible to generate a high-quality image of a specialist level that is suitable to diverse environments. Although the problems that an autofocus camera has in capturing the night scenes have been continuously raised, no solution has been proposed.

Accordingly, in addition to the existing method of compensating for the image blur by moving an optical system or an image sensor using sensor information such as optical image stabilization (OIS), there is a need for a method and apparatus for an adaptive exposure adjustment by sensing whether the present environment is a night scene.

SUMMARY OF THE INVENTION

Accordingly, the present invention has been made to solve the above-mentioned problems occurring in the prior art, and an object of the present invention is to obtain captured images having an optimized quality by providing a proper exposure of a specialist level when the images are captured through a digital camera.

Additional advantages, objects, and features of the invention will be set forth in part in the description which follows and in part will become apparent to those having ordinary skill in the art upon examination of the following or may be learned from practice of the invention.

In order to accomplish these objects, there is provided an apparatus for capturing images, according to the present invention, which includes an image-capturing unit capturing an image light from an object and generating a first digital image; a night-scene-sensing unit sensing whether the first digital image is a night-scene image; an exposure-adjustment unit adjusting an optimized exposure time by comparing an edge level of the night-scene image with that of a pre-generated reference image if it is sensed that the input image is the night-scene image; and a controller controlling the image-capturing unit to generate a second digital image based on the adjusted exposure time.

In another aspect of the present invention, there is provided a method of capturing images, which includes capturing an image light from an object and generating a first digital image; sensing whether the first digital image is a night-scene image; adjusting an optimized exposure time by comparing an edge level of the night-scene image with that of a pre-generated reference image if it is sensed that the input image is the night-scene image; and generating a second digital image based on the adjusted exposure time.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects, features and advantages of the present invention will be apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 1:
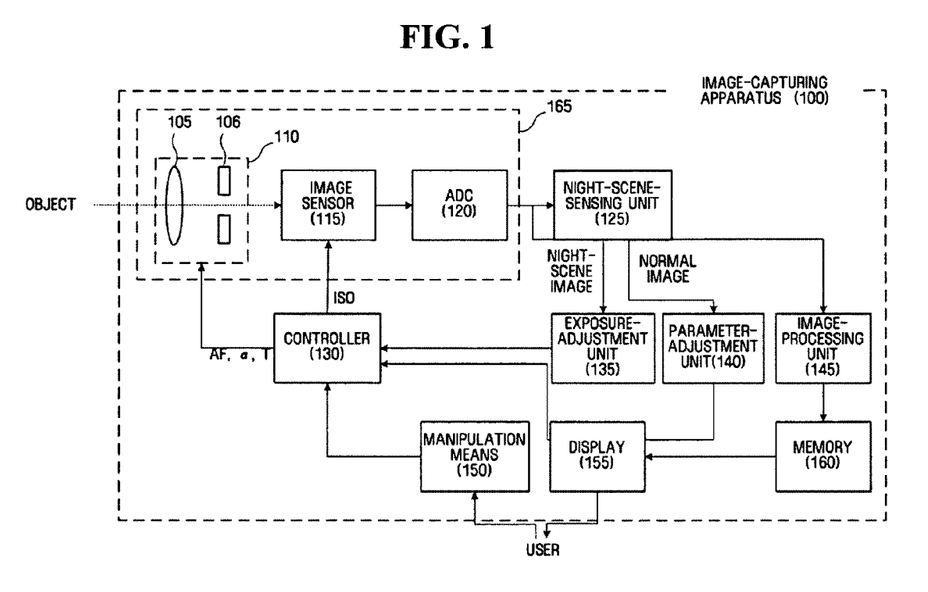
FIG. 1 is a block diagram illustrating the construction of an image-capturing apparatus according to an embodiment of the present invention.

FIG. 1 is a block diagram illustrating the construction of an image-capturing apparatus according to an embodiment of the present invention.

Light from an object passes through a lens assembly 110 that includes a lens 105, an aperture 106, and so forth, and then is incident to an image sensor 115. The image sensor 115 may be implemented by a CCD (Charge Coupled Device), a CMOS (Complementary Metal Oxide Semiconductor) sensor, and other image-acquiring means known in the art. An analog image signal obtained from an image formed on a pickup surface of the image sensor 115 is converted into a digital image signal by an ADC (Analog-to-Digital Converter) 120. The digital image signal is then inputted to a night-scene-sensing unit 125. The lens assembly 110, the image sensor 115, and the ADC 120 constitute an image-capturing unit generating a digital image from the object under the control of a controller 130.

A control signal that is the result of a user action is supplied to the controller 130 from a manipulation means 150. The controller 130 receives the control signal or a signal from an exposure-adjustment unit 135 or a parameter-adjustment unit 140, and controls the lens assembly 110 or the image sensor 115.

The lens assembly 110 receives parameters such as an auto focus (AF) setting, an aperture value $\alpha$, an exposure time T, and so forth, from the controller 130, and controls the lens focal length, aperture, or shutter speed according to the input parameter. The image sensor 115 receives an ISO (International Standards Organization) value from the controller 130, and adjusts the ISO of the picked image. The term "ISO" means the sensitivity of the film in a camera, and is a film-dependent value. In a digital camera, however, the ISO value can be variably set by amplifying the signal from the image sensor 115 using diverse methods.

The night-scene-sensing unit 125 senses whether the image is a night-scene image by analyzing the input digital image. The night-scene image basically has a low luminance distribution in comparison to a non-night scene image (i.e., a normal image). As a concrete reference for judging the night-scene image, Equation (1) below is exemplified. Here, Y denotes luminance of an input image, average (Y) denotes an average of the luminance of the input image, and EV denotes an exposure value.

$$\text{Average}(Y) < T_1 \text{ AND } EV < T_2 \qquad (1)$$

Accordingly, if the average of the luminance of the input image is lower than a specified threshold value $T_1$ and the exposure value is lower than another threshold value $T_2$, the input image is judged to be the night-scene image. The threshold values $T_1$ and $T_2$, can be properly set based by professional photographers.

The exposure value (EV) is generally calculated by Equation (2) below. Here, F denotes an aperture value, T denotes a shutter speed, and ISO denotes the sensitivity of the image sensor 115.

$$EV = \log(F^2/T) - \log(ISO/100) \qquad (2)$$

If it is judged that the input image is the night-scene image by the night-scene-sensing unit 125, the input image is provided to the exposure-adjustment unit 135 according to an embodiment of the present invention, while if it is judged that the input image is a normal image, the input image is provided to the typical parameter-adjustment unit 140.

The exposure-adjustment unit 135 receives the night-scene image, obtains an exposure time (or shutter speed) suitable to the night-scene image, and instructs the controller 130 to capture the image on the basis of the exposure time. The operation of the exposure-adjustment unit 135 will be later described in more detail with reference to FIG. 2.

The parameter-adjustment unit 140 receives the normal image, and adjusts typical 3A parameters. The 3A parameters mean three AF control parameters (Auto Focus), AE (Auto Exposure), and AWB (Auto White Balance). Accordingly, the controller 130 can adjust the focus (AF) of the lens of the lens assembly 110, the aperture value $\alpha$, and the exposure time T. The 3A parameter adjustment through the parameter-adjustment unit 140 and the control of the lens assembly 110 through the controller 130 are well known in the art.

It is also possible to additionally apply the typical parameter adjustment process, which is performed by the parameter-adjustment unit 140, to the image of which the exposure time has been adjusted by the exposure-adjustment unit 135.

If the input image is a night-scene image, the controller 130 adjusts the exposure time of the lens assembly 110 according to the instruction of the exposure-adjustment unit 135, and then the new image is inputted to an image-processing unit 145 after passing through the image sensor 115 and the ADC 120.

The image is a mega-pixel image that is stored as a file, but the image initially captured for the exposure adjustment through the exposure-adjustment unit 135 may be a preview image that is viewed through an LCD window of the camera.

The image-processing unit 145 performs a typical image process that includes adjustment of white balancing or color balancing, noise reduction, improvement of image details, and final storage of an image file. The image processed by the image-processing unit 145 may be stored in a memory 160, or may be displayed through a display 155 that is implemented by an LCD (Liquid Crystal Display), an OLED (Organic Light-Emitting Diode), and so forth.

Figure 2:
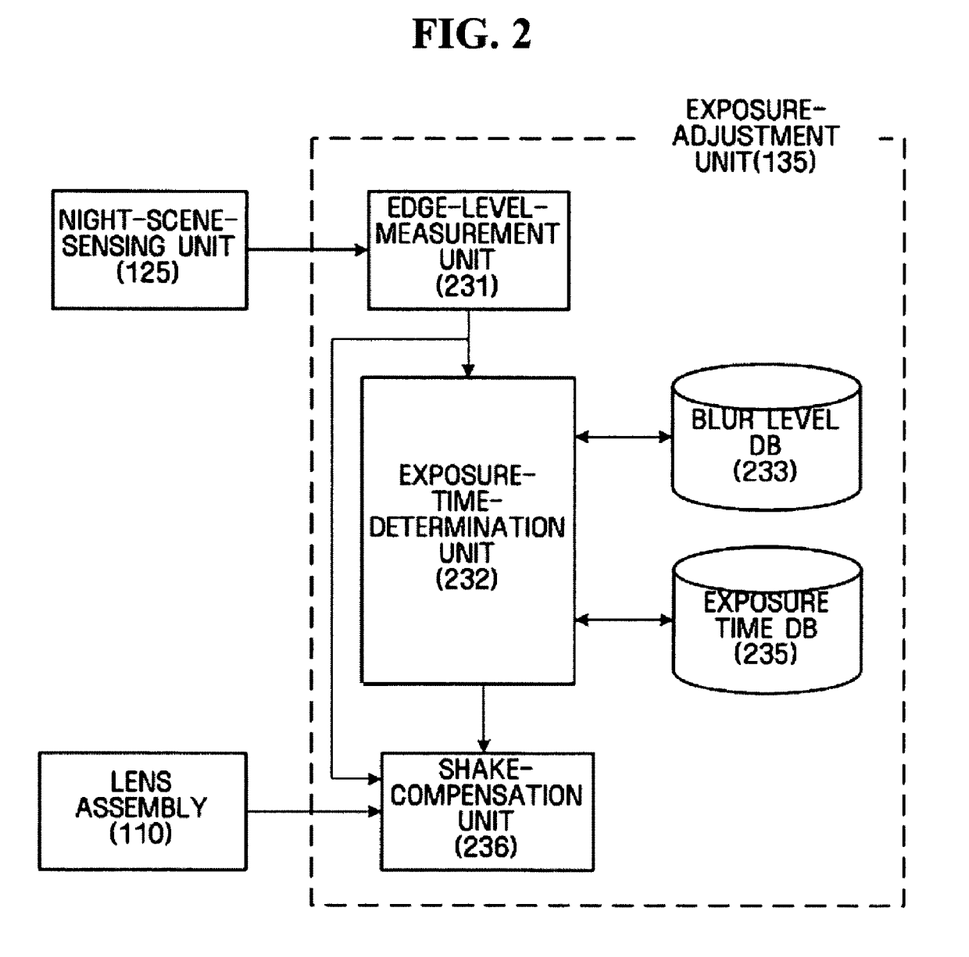
FIG. 2 is a block diagram illustrating the construction of an exposure-adjustment unit according to an embodiment of the present invention.

FIG. 2 is a block diagram illustrating the construction of an exposure-adjustment unit according to an embodiment of the present invention.

An edge-level-measurement unit 231 measures the edge level (i.e., degree of detail) of the night-scene image provided from the night-scene-sensing unit 125. Specifically, the edge-level-measurement unit 231 performs a frequency domain transform, e.g., a DCT (Discrete Cosine Transform), of the night-scene image, and may judge that the edge level becomes higher as high-frequency components become greater in the transformed domain. For example, in measuring the edge level, the edge-level-measurement unit 231 may consider the sum or average of absolute values of DCT coefficients of the night-scene image as a reference.

The exposure-adjustment unit 135 includes two databases, which are a blur level database (DB) 233 and an exposure time database (DB) 235. These DBs 233 and 235 are constructed as follows.

Figure 3:
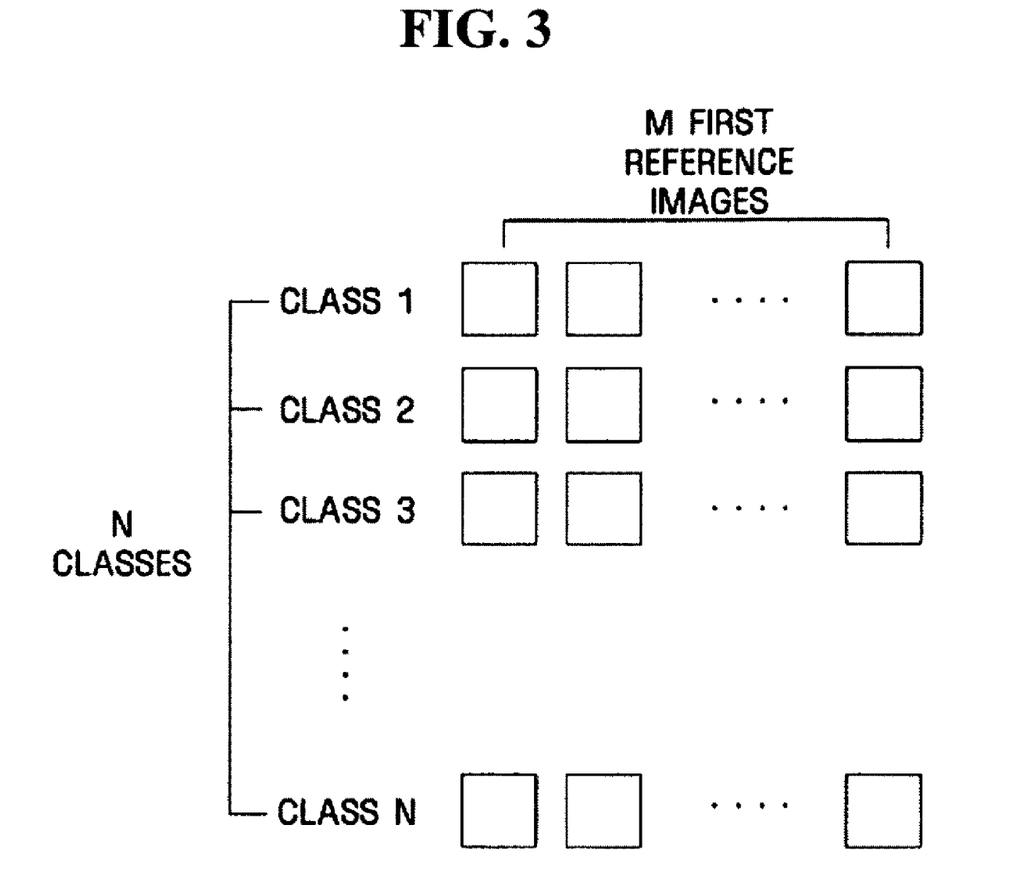
FIG. 3 is a view explaining first reference images classified according to their edge levels.
Figure 4:
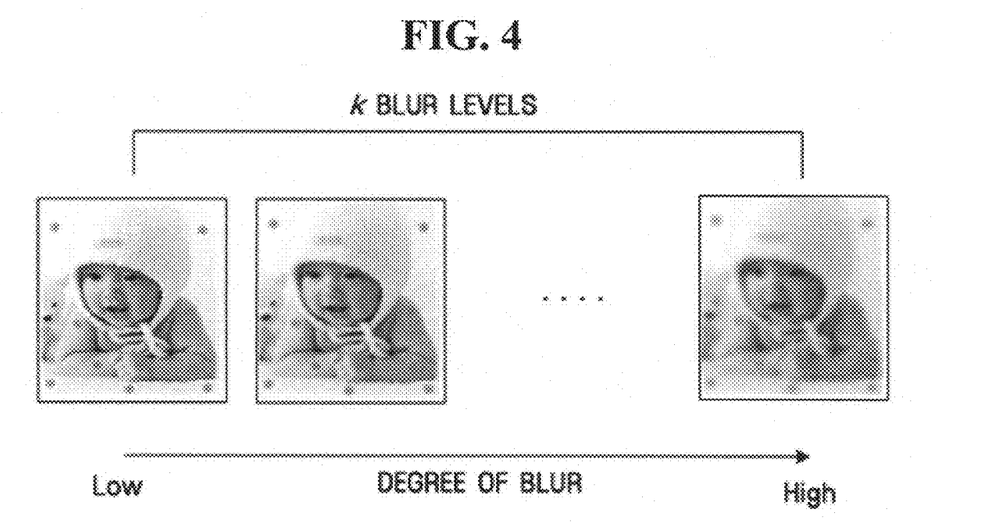
FIG. 4 is an exemplary view illustrating results of adding artificial blurs to the first reference images according to respective blur levels.

The blur level DB 233 includes diverse reference images which have been captured by users in night-scene environments and classified into a plurality of classes according to their edge levels. The blur level DB 233, for example, includes M reference images for N classes according to the edge levels. Accordingly, as illustrated in FIG. 3, the blur level DB 233 includes N*M reference images in all. The N*M reference images are all non-blur images captured by cameras mounted on tripods. In addition, the blur level DB 2 is provided with artificially blurred images as shown in FIG. 4, in accordance with k blur levels for N*M reference images. In FIG. 4, the left-side image is an image to which no blurring has been applied, and the right-side image is an image to which blurring has been applied most strongly. A typical Gaussian blur has been mainly used as the blurring technique.

Figure 5:
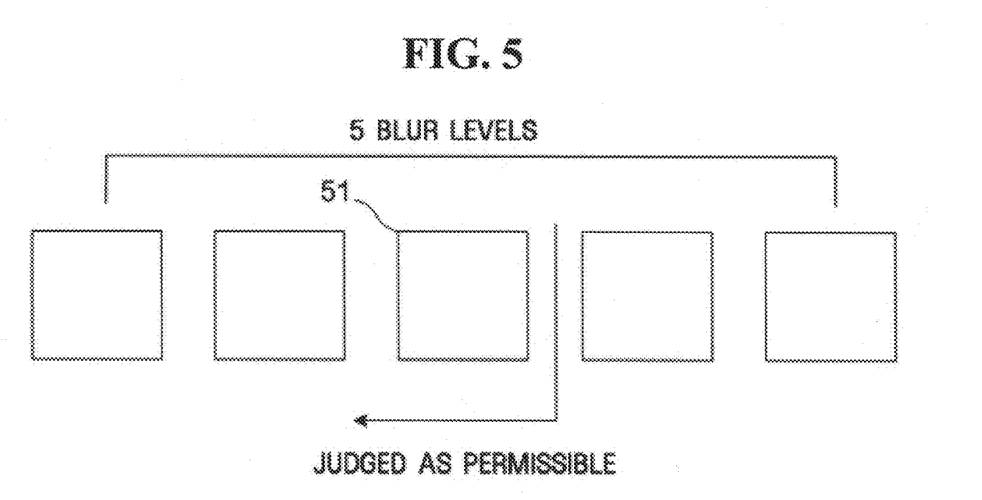
FIG. 5 is an exemplary view explaining selection of a threshold image from images having plural blur levels.

Then, the exposure-adjustment unit makes observers and professional photographers having a plurality of average times observe k images according to k blur levels, and selects visually permissible images by comparing the images with the original images to which no blur has been applied. For example, as shown in FIG. 5, only three left-side images are judged to be permissible among the images for 5 blur levels. That is, in the present reference image, the image 51 to which the third blur level has been applied will be the threshold image, and the blur level that the threshold image has will be the threshold blur level.

The process of obtaining the threshold image as described above is repeatedly performed with respect to all N*M reference images.

In the exposure time DB 235, reference images obtained by capturing the same objects as those of the N*M reference images (hereinafter referred to as "first reference images") may be stored. However, the N*M reference images stored in the exposure time DB 235 (hereinafter referred to as "second reference images") are images captured in actual image capturing environments using auto cameras, e.g., by cameras in hands without using tripods. In this case, a predetermined number of images are captured as the exposure time is diversely changed with respect to the N*M second reference images, and then the edge levels of the captured images are measured through the edge-level-measurement unit 231. Accordingly, the correlation of the exposure times with the edge levels can be obtained with respect to specified images among the second reference images. In the exposure time DB 235, a graph or a lookup table indicating the correlation may be stored.

After the edge-level-measurement unit 231 measures the edge level of the input night-scene image, an exposure-time-determination unit 232 determines an optimized exposure time of the night-scene image on the basis of the measured edge level and the exposure time when the night-scene image is captured, with reference to the exposure time DB 1235 and the blur level DB 233.

First, the exposure-time-determination unit 232 searches for an image that match the edge level and the exposure time of the night-scene image among the second reference images of the exposure time DB 235. The exposure-time-determination unit may judge that the searched image has the most similar property to the presently captured night-scene image.

The exposure-time-determination unit 232 searches the class of the first reference images, which are stored in the blur level DB 233 and correspond to the searched-for image, are positioned, and then searches for the image having the permissible blur level in the found first reference images, i.e., the threshold image.

Then, the exposure-time-determination unit 232 reads the exposure time which corresponds to the edge level of the searched-for threshold image, using the correlation between the exposure times and the edge levels stored in the exposure time DB 235. It can be considered that the read exposure time is the maximum value of the exposure time (that means the optimized value) which can be permitted in the present captured night-scene image. If the image capturing is performed for the exposure time that exceeds the maximum value, the blur level of the night-scene image will escape from the permissible range of the blur level DB 233.

A shake-compensation unit 236 provided in the exposure-adjustment unit 135 can additionally compensate for the exposure time determined by the exposure-time-determination unit 232 by adding shake information of the present camera to the calculated exposure time, based on only the edge information of the night-scene image measured by the edge-level-measurement unit 231. The shake-compensation unit 236 reduces the exposure time with reference to a specified model if the shake information exceeds the permissible value. Since the exposure time compensation technique using the shake information is well known in the art, the detailed explanation thereof will be omitted.

The components as illustrated in FIGS. 1 and 2 may be implemented by software components, such as tasks, classes, subroutines, processes, objects, execution threads, or programs, or by hardware components, such as FPGA (Field Programmable Gate Array) or ASIC (Application Specific Integrated Circuit), or by combinations of the software and hardware components. The components may be included in a computer-readable storage medium, or parts of the components may be distributed at a plurality of computers.

Figure 6:
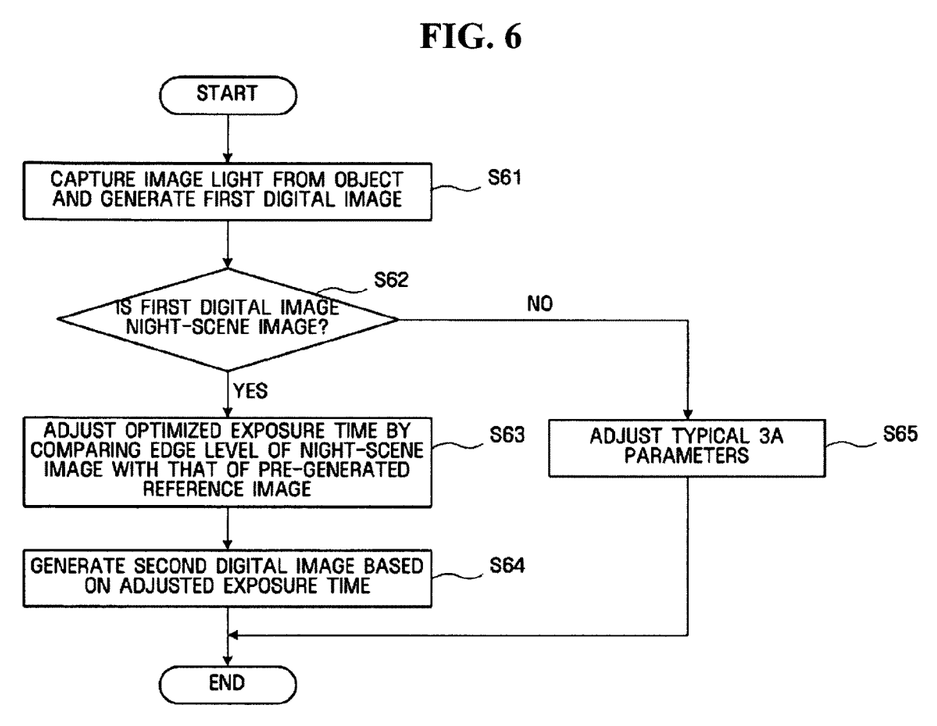
FIG. 6 is a flowchart illustrating an image-capturing method according to an embodiment of the present invention.

FIG. 6 is a flowchart illustrating an image-capturing method according to an embodiment of the present invention.

The image-capturing unit 165 captures light from an object and generates a first digital image S61. The first digital image is a preview image that is shown through an LCD window.

Here, S61 includes adjusting the exposure time, the auto focus, and the aperture under the control of the controller 130, generating an analog image signal by capturing the image light, and converting the analog image signal into a digital image signal.

The night-scene-sensing unit 125 senses whether the first digital image is a night-scene image S62. For example, the night-scene-sensing unit 125 can sense whether the first digital image is the night-scene image on the basis of the luminance average and the exposure value of the first digital image.

If it is sensed that the input image is the night-scene image ("Yes" in S62), the exposure-adjustment unit 135 adjusts the optimized exposure time by comparing the edge level of the night-scene image with that of the pre-generated reference image S63.

Under the control of the controller 130, the image-capturing unit 165 generates a second digital image on the basis of the exposure time S64. The second digital image is a megapixel image that is stored in a file.

Figure 7:
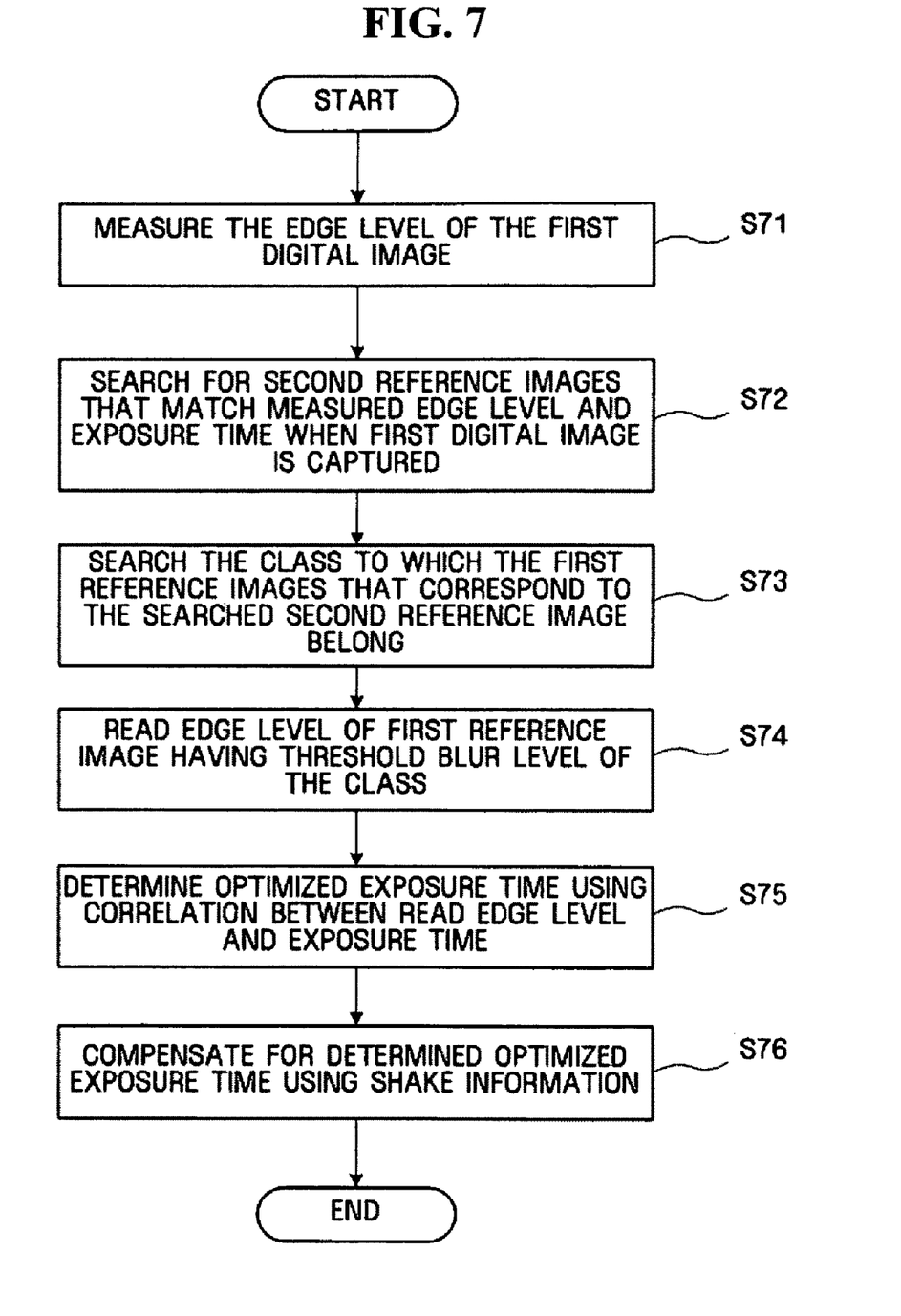
FIG. 7 is a flowchart illustrating in detail the steps in S63 illustrated in FIG. 6.

FIG. 7 is a flowchart illustrating the detailed steps of S63 illustrated in FIG. 6.

The edge-level-measurement unit 231 measures the edge level of the first digital image S71. The edge-level-measurement unit 231, for example, measures the edge level on the basis of coefficients obtained by performing a DCT of the first digital image.

The exposure-time-determination unit 232 searches for the second reference images matching the measured edge level and the exposure time of the first digital image S72, and then searches the class to which the first reference images that correspond to the searched second reference image belong S73. In addition, the exposure-time-determination unit 232 reads the edge level of the first reference image having the threshold blur level of the class S74, and determines the optimized exposure time using the correlation between the read edge level and the exposure time S75.

The first reference images, which are images captured with no shake, are classified into a specified number of classes according to the edge levels, and stored in the blur level DB 233. The second reference images, which are images corresponding to the first reference images and captured with shake, are stored in the exposure time DB 235. Also, the permissible threshold blur level for the first reference image is stored in the blur level DB 233. The threshold blur level is the blur level of a visually permissible image on the basis of the first reference images among the images generated through addition of the artificial blurs for blur levels to the first reference images.

In addition, the correlation between the edge levels of the second reference images and the exposure times is stored in the exposure time DB 235.

Last, the shake-compensation unit 236 additionally compensates for the optimized exposure time using the shake information of the image-capturing unit 165 S76.

As described above, according to the present invention, since the picture deterioration due to the use of a flash that does not suit the environment is prevented and professional adaptive exposure can be performed without using a tripod, an image having an optimized quality can be provided in a given environment.

Also, according to the present invention, by reducing the user's manual operations to suit the low-level luminance environment such as the night scene, a prompt image capturing is possible.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for capturing images, comprising:
   an image-capturing unit capturing an image light from an object and generating a first digital image;
   a night-scene-sensing unit sensing whether the first digital image is a night-scene image;
   an exposure-adjustment unit adjusting an optimized exposure time by comparing an edge level of the night-scene image with that of a pre-generated reference image if it is sensed that the input image is the night-scene image, and not adjusting an optimized exposure time if it is sensed that the input image is not the night-scene image; and
   a controller controlling the image-capturing unit to generate a second digital image based on the adjusted exposure time.

2. The apparatus of claim 1, wherein the image-capturing unit comprises:
   a lens assembly adjusting the exposure time, auto focus, and aperture under the control of the controller;
   an image sensor capturing the image light and generating an analog image signal; and
   an analog-to-digital converter (ADC) converting the analog image signal into a digital image signal.

3. The apparatus of claim 1, wherein the first digital image is a preview image, and the second digital image is a mega-pixel image.

4. The apparatus of claim 1, wherein the night-scene-sensing unit senses whether the first digital image is the night-scene image on the basis of an average luminance and an exposure value of the first digital image.

5. The apparatus of claim 1, wherein the exposure-adjustment unit comprises:
   an edge-level-measurement unit measuring the edge level of the first digital image;
   a first database storing first reference images captured with no blur and a permissible threshold blur level for the first reference images;
   a second database storing second reference images that correspond to the first reference images and are captured with blur and a correlation between edge levels of the second reference images and exposure times; and
   an exposure-time-determination unit determining the optimized exposure time from the measured edge level with reference to the first and second databases.

6. The apparatus of claim 5, wherein the edge-level-measurement unit measures the edge level on the basis of coefficients obtained by performing a DCT of the first digital image.

7. The apparatus of claim 5, wherein the first reference images are classified into a specified number of classes according to the edge levels of the first reference images.

8. The apparatus of claim 7, wherein the exposure-time-determination unit searches for the second reference images that match the measured edge level and the exposure time of the first digital image, searches a class to which the first reference images corresponding to the searched second reference images belong, reads the edge level of the first reference images having the threshold blur level of the class, and determines the optimized exposure time using the correlation between the read edge level and the exposure time.

9. The apparatus of claim 5, wherein the threshold blur level is a blur level of a visually permissible image on the basis of the first reference images among the images generated by adding an artificial blur to the first reference images for a plurality of blur levels.

10. The apparatus of claim 5, wherein the exposure-adjustment unit further comprises a shake-compensation unit compensating for the optimized exposure time using shake information of the image-capturing unit.

11. A method of capturing images comprising:
   capturing image light from an object and generating a first digital image;
   sensing whether the first digital image is a night-scene image;
   adjusting an optimized exposure time by comparing an edge level of the night-scene image with that of a pre-generated reference image if it is sensed that the input image is the night-scene image, and not adjusting an optimized exposure time if it is sensed that the input image is not the night-scene image; and
   generating a second digital image based on the adjusted exposure time.

12. The method of claim 11, wherein the generating of the first digital image comprises:
   adjusting the exposure time, auto focus, and aperture under the control of the controller;
   capturing the image light and generating an analog image signal; and converting the analog image signal into a digital image signal.

13. The method of claim 11, wherein the first digital image is a preview image, and the second digital image is a megapixel image.

14. The method of claim 11, wherein the sensing comprises sensing whether the first digital image is the night-scene image on the basis of an average luminance and an exposure value of the first digital image.

15. The method of claim 11, wherein the adjusting comprises:
measuring the edge level of the first digital image; and
determining the optimized exposure time from the measured edge level with reference to a first database storing first reference images captured with no blur and a permissible threshold blur level for the first reference images and a second database storing second reference images that correspond to the first reference images and are captured with blur and a correlation between edge levels of the second reference images and exposure times.

16. The method of claim 15, wherein the measuring comprises measuring the edge level on the basis of coefficients obtained by performing a DCT of the first digital image.

17. The method of claim 15, wherein the first reference images are classified into a specified number of classes according to the edge levels of the first reference images.

18. The method of claim 17, wherein the determining comprises:
searching for the second reference images that match the measured edge level and the exposure time of the first digital image;
searching a class to which the first reference images corresponding to the searched second reference images belong;
reading the edge levels of the first reference images having the threshold blur level of the class; and
determining the optimized exposure time using the correlation between the read edge level and the exposure time.

19. The method of claim 15, wherein the threshold blur level is a blur level of a visually permissible image on the basis of the first reference images among the images generated by adding an artificial blur to the first reference images for a plurality of blur levels.

20. The method of claim 15, wherein the determining further comprises compensating for the optimized exposure time using shake information of the image.

* * * * *